(12) United States Patent
Chang et al.

(10) Patent No.: US 9,123,486 B2
(45) Date of Patent: Sep. 1, 2015

(54) TACTILE FEEDBACK APPARATUS

(71) Applicant: Industrial Technology Research Institute, Hsinchu (TW)

(72) Inventors: Chih-Chia Chang, Hsinchu County (TW); Chen-Pang Kung, Taoyuan County (TW); Wen-Jen Chiang, Hsinchu County (TW); Sheng-Wei Chen, Kinmen County (TW)

(73) Assignee: Industrial Technology Research Institute, Hsinchu (TW)

( * ) Notice: Subject to any disclaimer, the term of this patent is extended or adjusted under 35 U.S.C. 154(b) by 326 days.

(21) Appl. No.: 13/707,533

(22) Filed: Dec. 6, 2012

(65) Prior Publication Data

US 2013/0334024 A1    Dec. 19, 2013

(30) Foreign Application Priority Data

Jun. 19, 2012  (TW) .............................. 101121907 A

(51) Int. Cl.
  *G08B 6/00*     (2006.01)
  *H01H 13/85*   (2006.01)

(52) U.S. Cl.
  CPC ..................................... *H01H 13/85* (2013.01)

(58) Field of Classification Search
  CPC ........................................................ H01H 13/85
  USPC ...................................... 340/506, 438, 407.2
  See application file for complete search history.

(56) References Cited

U.S. PATENT DOCUMENTS

| | | |
|---|---|---|
| 5,818,429 A | 10/1998 | Tanaka et al. |
| 6,943,785 B2 | 9/2005 | Chou et al. |
| 7,084,860 B1 | 8/2006 | Jaeger et al. |
| 7,609,178 B2 | 10/2009 | Son et al. |
| 7,924,144 B2 | 4/2011 | Makinen et al. |
| 7,982,588 B2 | 7/2011 | Makinen et al. |
| 8,031,094 B2 | 10/2011 | Hotelling et al. |
| 2003/0067449 A1 | 4/2003 | Yoshikawa et al. |
| 2006/0090632 A1 | 5/2006 | Ludwig |
| 2008/0157893 A1 | 7/2008 | Krah |
| 2010/0079263 A1 | 4/2010 | Anabuki et al. |

(Continued)

FOREIGN PATENT DOCUMENTS

| | | |
|---|---|---|
| CN | 101520703 | 9/2009 |
| CN | 102099769 | 6/2011 |

(Continued)

OTHER PUBLICATIONS

Kaczmarek et al., "Polarity Effect in Electrovibration for Tactile Display," IEEE Transctaions on Biomedical Engineering 53 (10), Oct. 2006, pp. 2047-2054.

(Continued)

*Primary Examiner* — Daryl Pope
(74) *Attorney, Agent, or Firm* — Jianq Chyun IP Office

(57) ABSTRACT

A tactile feedback apparatus is disclosed. The tactile feedback apparatus includes at least one tactile feedback unit. The feedback tactile sense unit includes at least one feedback electrode, a dielectric layer and at least one reference electrode. A common reference potential is formed by a user's finger and the tactile feedback apparatus using the reference electrode. An electric filed is generated on the user's finger by the dielectric layer and the feedback electrode to provide a tactile feedback. Besides, the tactile feedback apparatus also provides a touch sensing function.

22 Claims, 10 Drawing Sheets

(56) References Cited

U.S. PATENT DOCUMENTS

| | | | |
|---|---|---|---|
| 2010/0127999 | A1 | 5/2010 | Kim et al. |
| 2010/0141407 | A1* | 6/2010 | Heubel et al. .............. 340/407.1 |
| 2010/0328053 | A1 | 12/2010 | Yeh et al. |
| 2011/0074732 | A1 | 3/2011 | Reynolds |
| 2011/0084857 | A1 | 4/2011 | Marino et al. |
| 2011/0109568 | A1 | 5/2011 | Wu et al. |
| 2011/0134063 | A1 | 6/2011 | Norieda |
| 2011/0141052 | A1 | 6/2011 | Bernstein et al. |
| 2011/0169758 | A1 | 7/2011 | Aono |
| 2011/0187651 | A1 | 8/2011 | Whitlow et al. |
| 2011/0210941 | A1 | 9/2011 | Reynolds et al. |
| 2011/0215914 | A1 | 9/2011 | Edwards |
| 2011/0227872 | A1 | 9/2011 | Huska et al. |
| 2011/0279250 | A1 | 11/2011 | Ryhanen et al. |
| 2012/0056838 | A1 | 3/2012 | Harris et al. |
| 2013/0033450 | A1 | 2/2013 | Coulson et al. |
| 2013/0093725 | A1 | 4/2013 | Reynolds |

FOREIGN PATENT DOCUMENTS

| | | |
|---|---|---|
| TW | M363640 | 8/2009 |
| TW | M363641 | 8/2009 |
| TW | M375253 | 3/2010 |
| TW | M387304 | 8/2010 |
| TW | M393736 | 12/2010 |
| TW | M393737 | 12/2010 |
| TW | 201112080 | 4/2011 |
| TW | M410923 | 9/2011 |
| TW | 201140397 | 11/2011 |
| TW | 201218039 | 5/2012 |

OTHER PUBLICATIONS

Forlines et al., "Evaluating Tactile Feedback and Direct vs. Indirect Stylus Input in Pointing and Crossing Selection Tasks," CHI 2008 Proceedings—Tactile and Haptic User Interfaces, Apr. 5-10, 2008, pp. 1563-1572.

Israr et al., "Frequency and amplitude discrimination along the kinestheic-cutaneous continuum in the presence of masking stimuli," Journal of the Acoustical Society of America 120 (5), Nov. 2006, pp. 2789-2800.

Brewster et al., "Tactile Feedback for Mobile Interactions," CHI 2007 Proceedings—Mobile Interaction, Apr. 28-May 3, 2007, pp. 159-162.

Harrison et al., "Providing Dynamically Changeable Physical Buttons on a Visual Display," CHI 2009—Clicking on Buttons, Apr. 6, 2009, pp. 299-308.

Yamamoto et al., "Electrostatic Tactile Display with Thin Film Slider and Its Application to Tactile Telepresentation Systems," IEEE Transactions on Visualization Computer Graphics 12 (2), Mar.-Apr. 2006, pp. 168-177.

"Office Action of US Counterpart Application", issued on May 16, 2014, p. 1-p. 16.

"Office Action of Taiwan Counterpart Application" , issued on Mar. 13, 2014, p. 1-p. 8.

"Office Action of Taiwan Counterpart Application", issued on Sep. 26, 2014, p. 1-p. 3.

"Notice of Allowance of related U.S. Appl. No. 13/413,628", issued on Apr. 6, 2015, p. 1-p. 14.

"Notice of Allowance of related U.S. Appl. No. 13/615,588", issued on Apr. 6, 2015, p. 1-p. 14.

\* cited by examiner

TACTILE FEEDBACK APPARATUS

CROSS-REFERENCE TO RELATED APPLICATION

This application claims the priority benefit of Taiwan application serial no. 101121907, filed on Jun. 19, 2012. The entirety of the above-mentioned patent application is hereby incorporated by reference herein and made a part of this specification.

BACKGROUND

1. Technical Field

The disclosure is directed to a tactile feedback apparatus structure.

2. Related Art

In the electronic techniques nowadays, it has become a trend to improve interaction between an electronic apparatus and a user through a touch technique. When using a touch panel, the user can transmit control instructions to the electronic apparatus through the touch panel. Thus, comparing with a keyboard in the related art, control operations can be easier and more directly performed on the electronic apparatus. However, such control manner though a touch screen lacks a real tactile feedback in return. The tactile feedback as defined in behavior is mainly a perceivable action generated when the screen is touched by a finger rather than a visible change.

In the technical field of the related art, tactile feedback reaction mostly applied to the touch screen is based on vibrating stimulation, but cannot be applied to the touch screen of a flexible electronic apparatus. Accordingly, with stimulation to the user's finger through a generated electric filed, the tactile feedback can be generated when the tactile feedback apparatus with the electric filed is touched by the user's finger, so that application value of the touch panel can be improved.

SUMMARY

A plurality of tactile feedback apparatuses to generate a tactile feedback for users is introduced herein.

A tactile feedback apparatus is introduced herein. The tactile feedback apparatus includes at least one tactile feedback unit having at least one patterned feedback electrode, a dielectric layer and at least one reference electrode. The dielectric layer covers the at least one patterned feedback electrode and has at least one opening on a first surface. Each reference electrode is disposed in the opening and at least one surface thereof is exposed. The reference electrode is isolated from the patterned feedback electrode. The reference electrode corresponds to the first surface, and the reference electrode and the patterned feedback electrode are either non-overlapped or at least partially overlapped.

Another tactile feedback apparatus is introduced herein, which includes at least one tactile feedback unit having a feedback electrode layer, a dielectric layer and a patterned reference electrode. The dielectric layer covers the feedback electrode layer by a first surface of the dielectric layer. The patterned reference electrode is embedded in the dielectric layer and covers a portion of a second surface of the dielectric layer so as to expose the patterned reference electrode. The feedback electrode layer receives a feedback driving signal, and the patterned reference electrode receives a reference signal.

To sum up, the tactile feedback apparatus introduced herein serves to generate an electric filed on a medium (e.g. a finger) touched by the user through the feedback electrode, the dielectric layer and the reference electrode on the tactile feedback unit, such that a tactile feedback reaction is generated to the user to improve the quality of a touch apparatus equipped with the tactile feedback apparatus.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
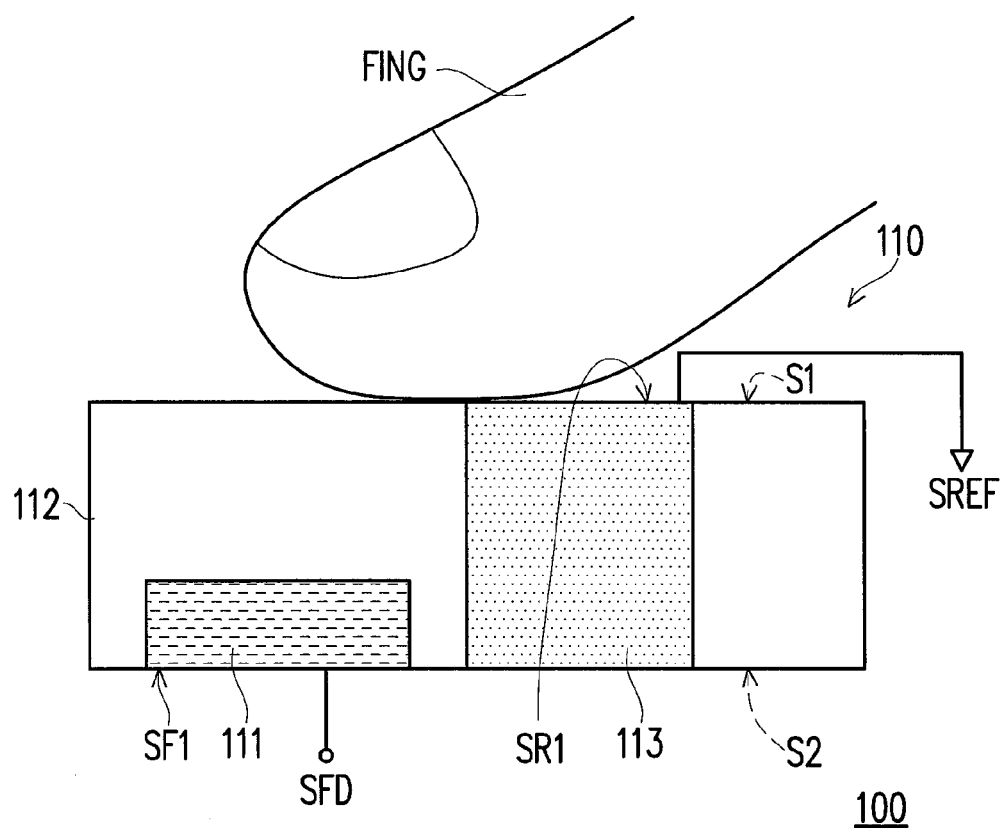
FIG. 1A is a structural sectional diagram illustrating a tactile feedback apparatus 100 according to an embodiment of the disclosure.

Hereinafter, referring to FIG. 1A, FIG. 1A is a structural sectional diagram illustrating a tactile feedback apparatus 100 according to an embodiment of the disclosure. The tactile feedback apparatus 100 includes one or more tactile feedback units 110, and the tactile feedback unit 110 includes a patterned feedback electrode 111, a dielectric layer 112 and a reference electrode 113. The dielectric layer 112 covers the patterned feedback electrode 111 and has a first surface S1 configured as a contact surface for a user's finger FING. The first surface of the dielectric layer 112 has an opening thereon. The reference electrode 113 is disposed in the opening and has at least one surface SR1 exposed from the first surface S1. In the present embodiment, the reference electrode 113 is separated and isolated from the patterned feedback electrode 111 by the dielectric layer 112 and corresponds to the first surface S1 without either overlapping or at least partially overlapping the first surface S1. In other words, viewing into the tactile feedback apparatus 100 from the first surface S1, the reference electrode 113 and the patterned feedback electrode 111 are separated from each other, or at least partially non-overlap with each other.

The reference electrode 113 receives a reference signal SREF through a wire, and the patterned feedback electrode 111 receives a feedback driving signal through another wire. When the user's finger FING touches the tactile feedback apparatus 100, a voltage value provided by the reference signal SREF on the reference electrode 113 allows the user's finger FING and the tactile feedback apparatus 100 to equal to a common reference potential when the reference electrode 113 is touched by the user's finger FING. In the present embodiment, the reference signal SREF may be a grounding voltage of 0 volt. However, since different users have different sensibilities of tactile feedbacks, the voltage value of the reference signal SREF may be adjusted adequately. For example, the voltage value of the reference signal SREF may be within +10V~−10 volts.

When the first surface S1 of the dielectric layer 112 is touched by the user's finger FING, a capacitance effect is formed by a feedback driving signal SFD provided to the patterned feedback electrode 111 through the dielectric layer 112 so as to form an electric filed between the patterned feedback electrode 111 and the user's finger FING. Based on this electric filed, a tactile feedback is generated on the user's finger PING.

To simplify, if the feedback driving signal SFD received by the patterned feedback electrode 111 is a positive voltage, the user's finger FING senses that a negative voltage is generated. In the opposite, if the feedback driving signal SFD received by the patterned feedback electrode 111 is a negative voltage, the user's finger FING senses that a positive voltage is generated. Certainly, the feedback driving signal SFD may also be a DC voltage signal that is not continuously maintained as positive or negative, or an AC signal. The feedback driving signal SFD with an alternating current may be an AC signal in various wave forms, such as a sine-wave signal, square-wave signal, triangular-wave signal or any other waveform signal.

Accordingly, it can be known that through the reference signal SREF, a common reference potential, such as a grounding potential, is formed by the user's finger FING and the tactile feedback apparatus 100 to increased intensity of the electric filed generated between the finger FING and the patterned feedback electrode 111 so that the sensibility of the tactile feedback generated by the user's finger FING based on the electric filed is improved.

In the present embodiment, the opening belonging to the dielectric layer 112 interpenetrates between the first surface S1 and a second surface S2 of the dielectric layer 112, which are opposite to each other. Meanwhile, for planarizing the tactile feedback apparatus 100, a surface SF1 of the patterned feedback electrode 111 is aligned with the second surface S2 of the dielectric layer 112, and a surface SR1 exposed from the reference electrode 113 may be aligned with the first surface S1, or alternatively, the surface SR1 exposed from the reference electrode 113 may also be lower than the first surface S1.

Besides, the surface SF1 of the patterned feedback electrode 111 and the surface SR1 of the reference electrode 113 do not have to be presented squarely. Alternatively, the surface SF1 of the patterned feedback electrode 111 and the surface SR1 of the reference electrode 113 may also be triangular, round, or any other shape.

For preventing a prick caused by an overly large electric filed when the user touches, current transmission capacity provided by the reference signal SREF is not more than 5 milliamp.

Figure 1B:
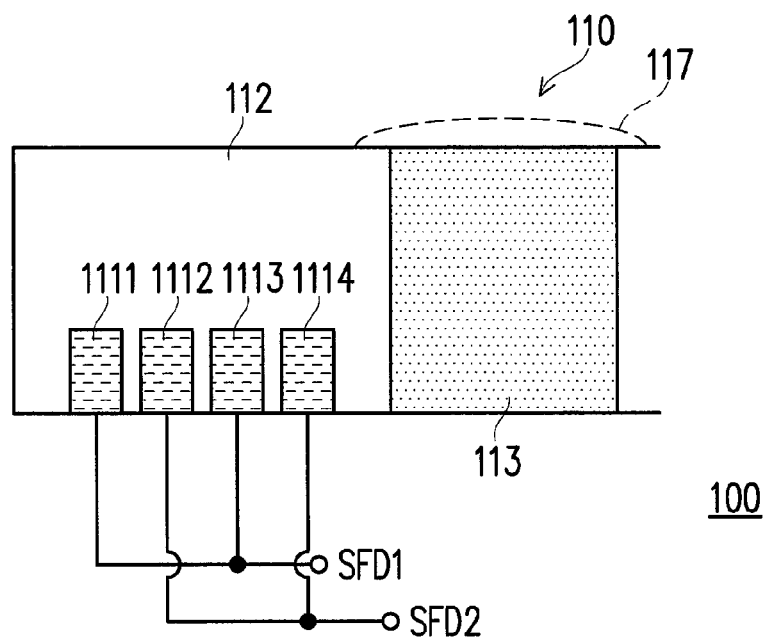
FIG. 1B a structural sectional diagram illustrating a tactile feedback apparatus 100 according to another embodiment of the disclosure.

Referring to FIG. 1B hereinafter, FIG. 1B a structural sectional diagram illustrating a tactile feedback apparatus 100 according to another embodiment of the disclosure. In the present embodiment, the tactile feedback apparatus 100 includes one or more tactile feedback units 110. The tactile feedback unit 110 has a patterned feedback electrode group constructed of a plurality of patterned feedback electrodes 1111~1114 disposed adjacently one by one. An electrical signal received by the patterned feedback electrodes 1111 and 1113 is a feedback driving signal SFD1, and an electrical signal received by the patterned feedback electrodes 1112 and 1114 is a feedback driving signal SFD2. The feedback driving signals SFD1 and SFD2 has opposite polarities. Otherwise, the feedback driving signals SFD1 and SFD2 may have the same polarity. Namely, the signal polarities of the patterned feedback electrodes adjacently disposed one by one may be either opposite or the same.

In the embodiment illustrated in FIG. 1B, the tactile feedback apparatus 100 may further include a conductive adhesive layer 117. The conductive adhesive layer 117 covers the surface SR1 of the reference electrode 113. In other words, the surface SR1 exposed from the first surface S1 is covered by the conductive adhesive layer 117 so as to protect the exposed reference electrode 113 from being oxidized, corroded or worn due to being touched by the finger or other external objects.

Figure 2A:
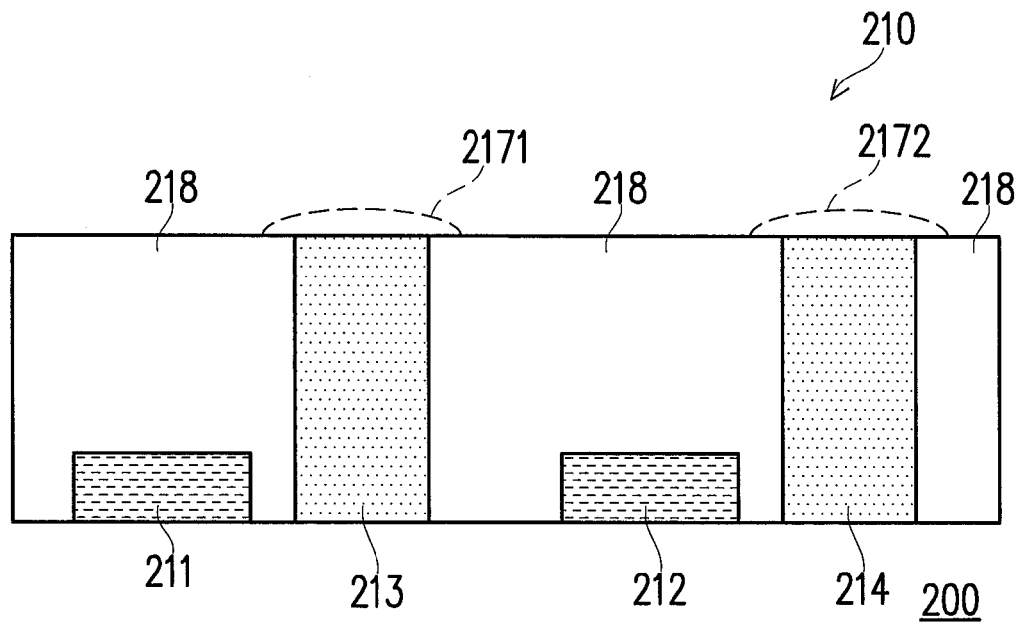
FIG. 2A through FIG. 2C are structural sectional diagrams respectively illustrating different implementing methods of a tactile feedback apparatus 200 according to another embodiment of the disclosure.
Figure 2B:
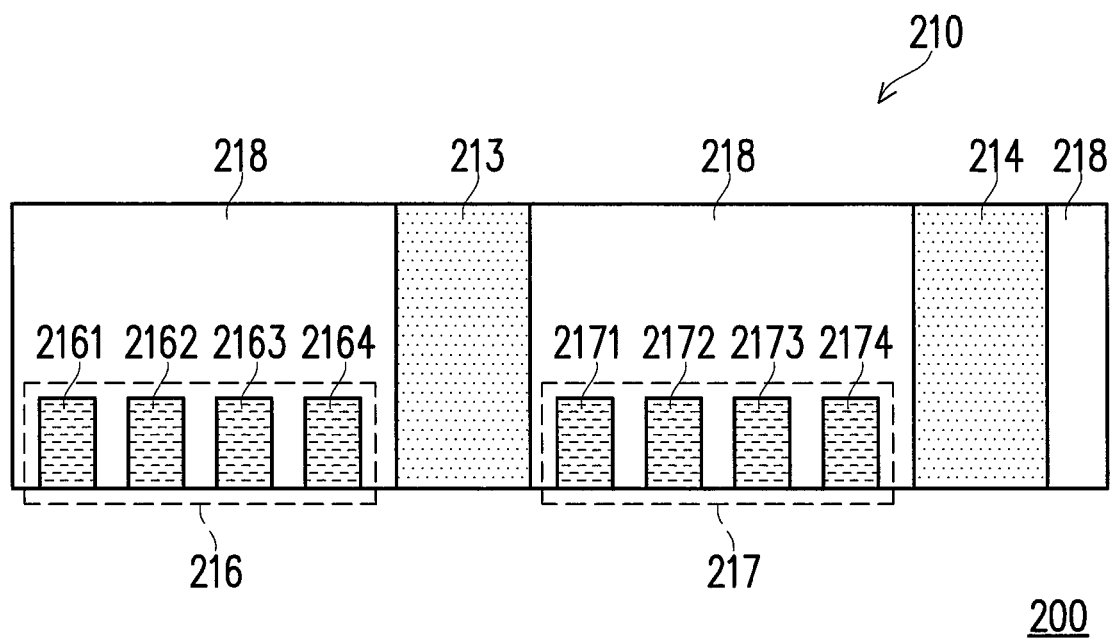
Figure 2C:
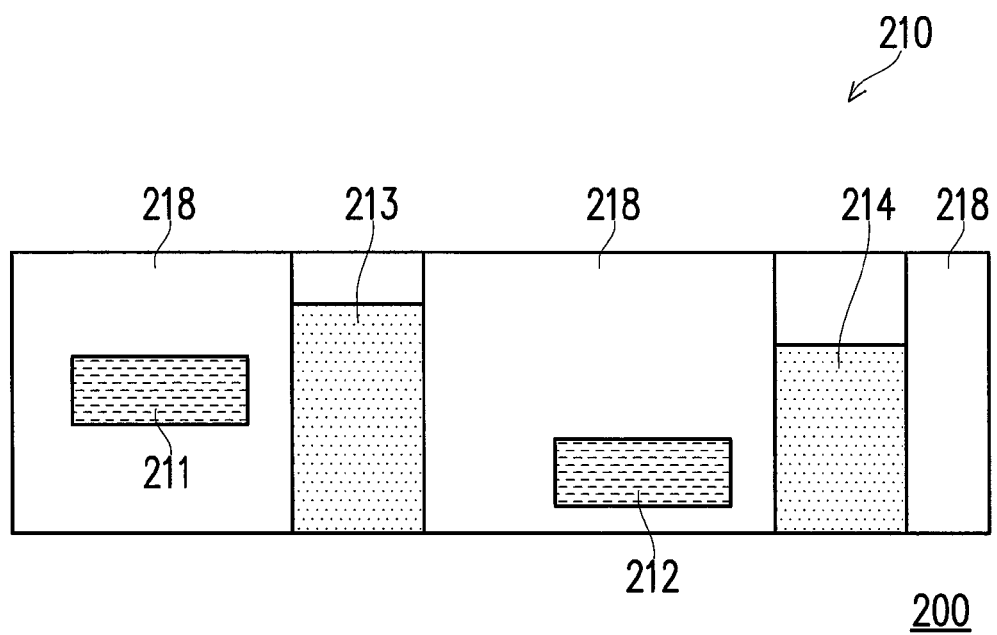

Next, referring to FIG. 2A, FIG. 2B and FIG. 2C, FIG. 2A, FIG. 2B and FIG. 2C are structural sectional diagrams respectively illustrating different implementing methods of a tactile feedback apparatus 200 according to another embodiment of the disclosure. In FIG. 2A, the tactile feedback apparatus 200 includes one or more tactile feedback units 210. The tactile feedback unit 210 includes patterned feedback electrodes 211 and 212, a dielectric layer 218 and reference electrodes 213 and 214. The reference electrodes 213 and 214 are respectively disposed in openings of the dielectric layer 218. An opening of a reference electrode (taking the reference electrode 213 for example) is located between the patterned feedback electrodes 211 and 212 adjacent to each other.

Besides, the tactile feedback apparatus 200 may further include conductive adhesive layers 2171 and 2172 covering the reference electrodes 213 and 214, respectively.

According to the illustration of FIG. 2B, the tactile feedback apparatus 200 one or more tactile feedback units 210. The tactile feedback unit 210 has a plurality of patterned feedback electrode groups 216 and 217, the dielectric layer 218 and the reference electrodes 213 and 214. The patterned feedback electrode groups 216 and 217 are respectively constructed of patterned feedback electrodes 2161~2164 and patterned feedback electrodes 2171~2174. The reference electrodes 213 and 214 are respectively disposed in the openings of the dielectric layer 218. The opening in which the reference electrode (e.g. the reference electrode 21) is disposed is located between the adjacent patterned feedback electrode groups 216 and 217.

In FIG. 2C, the patterned feedback electrodes 211 and 212 are embedded into the dielectric layer 218. That is, surfaces of the patterned feedback electrode 211 and 212 are not exposed. In addition, the reference electrodes 213 and 214 fill in the openings of the dielectric layer 218, and namely, surfaces of the reference electrode 213 and 214 are lower than the surface of the dielectric layer 218.

Figure 3A:
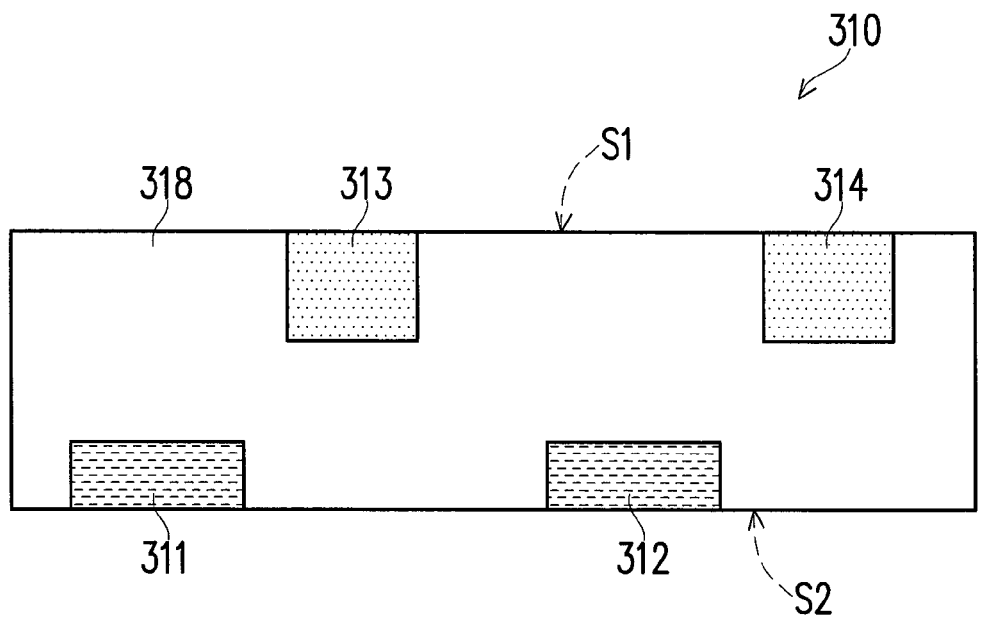
FIG. 3A and FIG. 3B are structural sectional diagrams respectively illustrating a tactile feedback apparatus 300 according to yet another embodiment of the disclosure.
Figure 3B:
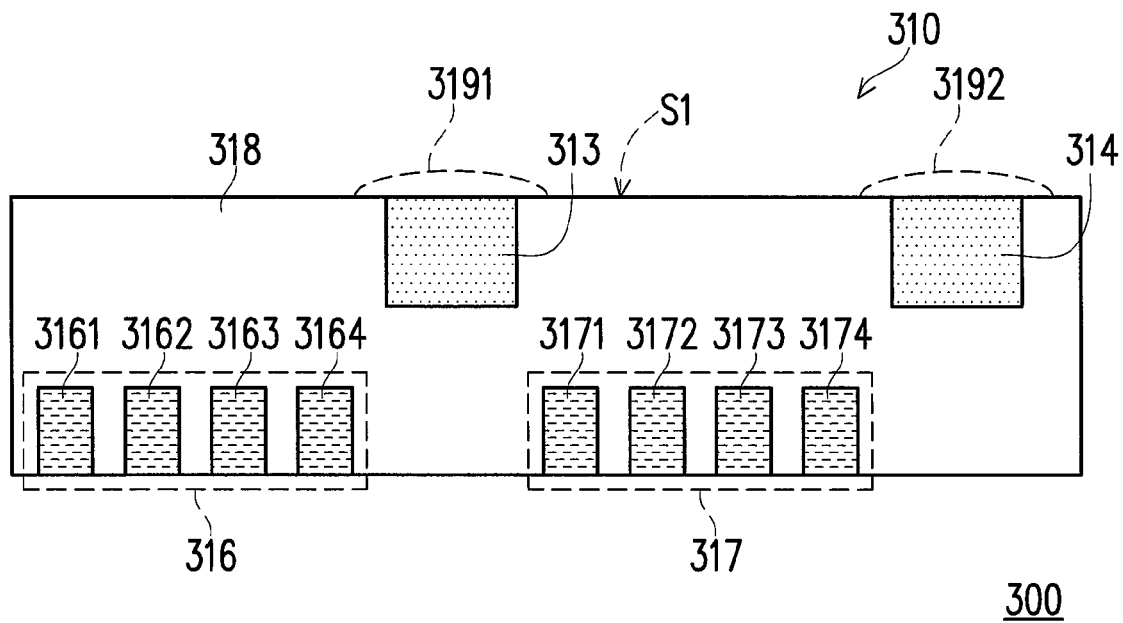

Continuously referring FIG. 3A and FIG. 3B, FIG. 3A and FIG. 3B are structural sectional diagrams respectively illustrating a tactile feedback apparatus 300 according to yet another embodiment of the disclosure. In FIG. 3A, the tactile feedback apparatus 300 includes one or more tactile feedback units 310. The tactile feedback unit 310 includes a plurality of patterned feedback electrodes 311 and 312, a dielectric layer 318 and a plurality of reference electrodes 313 and 314 respectively disposed in openings of the dielectric layer 318. It should be noted that in the present embodiment, the openings of the dielectric layer 318 are blind holes disposed on a first surface S1 of the dielectric layer 318. Thus, the reference electrode 313 and 314 do not penetrate the first surface S1 and the second surface S2 of the dielectric layer 318.

Besides, in FIG. 3B, the tactile feedback apparatus 300 includes one or more tactile feedback units 310 including a plurality of patterned feedback electrode groups 316 and 317, the dielectric layer 318 and a plurality of reference electrodes 313 and 314 respectively disposed in the openings of the dielectric layer 318. In the present embodiment, the openings of the dielectric layer 318 are blind holes disposed on the first surface S1 of the dielectric layer 318. The patterned feedback electrode groups 316 and 317 are respectively constructed of patterned feedback electrodes 3161~3164 and patterned feedback electrodes 3171~3174.

Besides, the tactile feedback apparatus 300 may further includes conductive adhesive layers 3191 and 3192 respectively covering the reference electrodes 313 and 314.

Figure 4A:
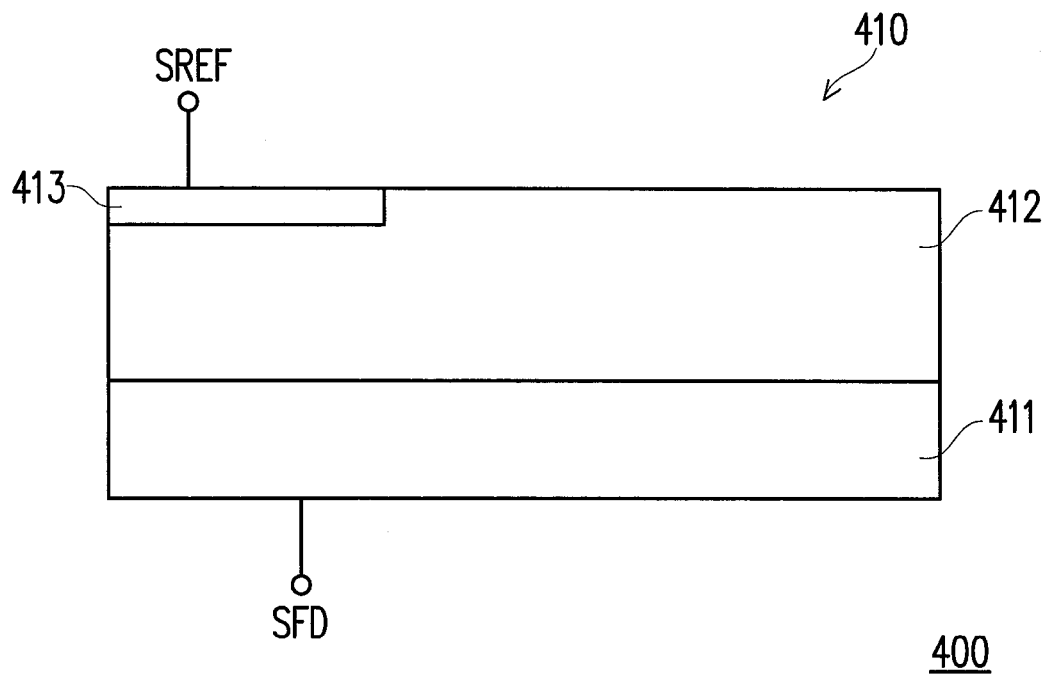
FIG. 4A through FIG. 4H are structural sectional diagrams respectively illustrating different implementing methods of a tactile feedback apparatus 400 according to still another embodiment of the disclosure.

Referring to FIG. 4A, FIG. 4A is a structural sectional diagram illustrating an implementing method of a tactile feedback apparatus 400 according to still another embodiment of the disclosure. The tactile feedback apparatus 400 includes one or more tactile feedback units 410 including a feedback electrode layer 411, a dielectric layer 412 and a patterned reference electrode 413. The dielectric layer 412 covers the feedback electrode layer 411 by a first surface of the dielectric layer 412. The patterned reference electrode 413 is embedded in the dielectric layer 412 and covers apportion of a second surface (such as an upper surface) of the dielectric layer 412 to expose the patterned reference electrode 413. The patterned reference electrode 413 may be embedded in the dielectric layer 412 without an upper surface thereof protruding (which may also be aligned with) the upper surface of the dielectric layer 412. Accordingly, flatness of the tactile feedback apparatus 400 is improved.

The patterned reference electrode 413 receives the reference signal SREF through a wire, and the feedback electrode layer 411 receives the feedback driving signal SFD through a wire. When the user's finger contacts the patterned reference electrode 413, the patterned reference electrode 413 allows the user's finger and the tactile feedback apparatus 400 to form a common reference potential according to a voltage provided by the reference signal SREF. When the user's finger contacts the surface of the dielectric layer 412 that is not covered by the patterned reference electrode 413, the feedback electrode layer 411 forms an electric field between the user's finger and the feedback electrode layer 411 according to the received feedback driving signal SFD and allow the user's finger to generate the tactile feedback based on the electric filed.

Figure 4B:
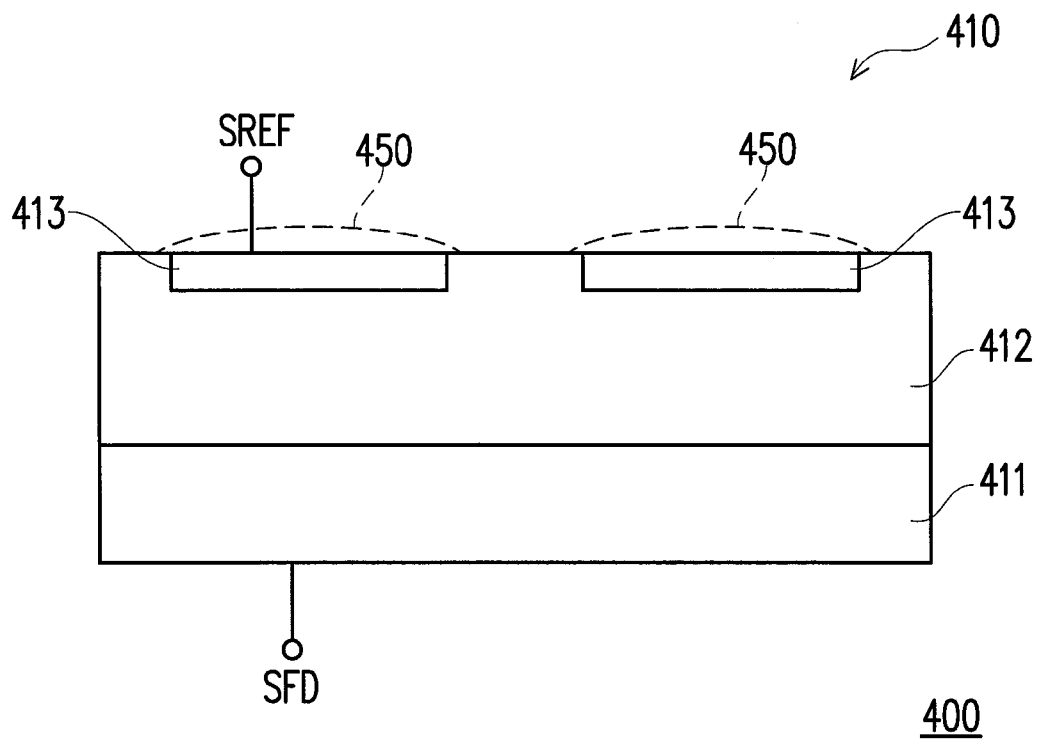
Figure 4C:
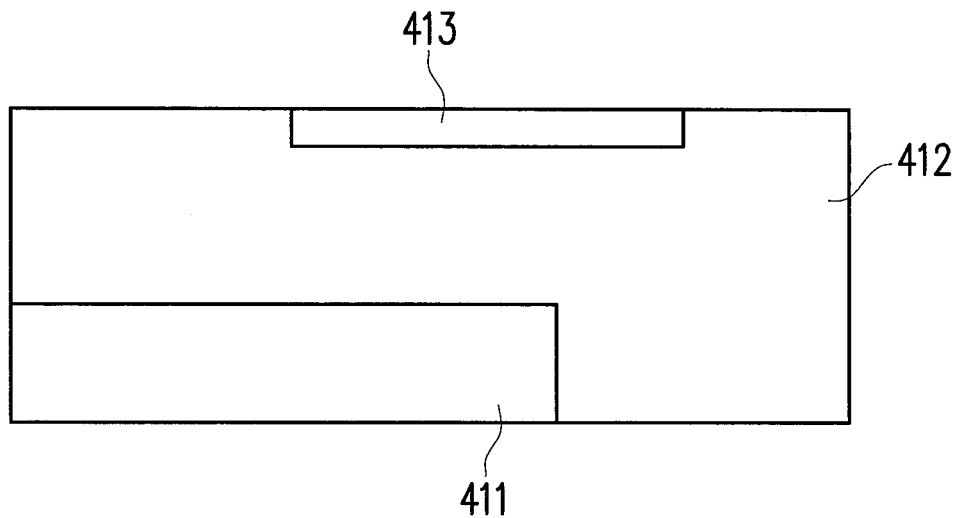
Figure 4D:
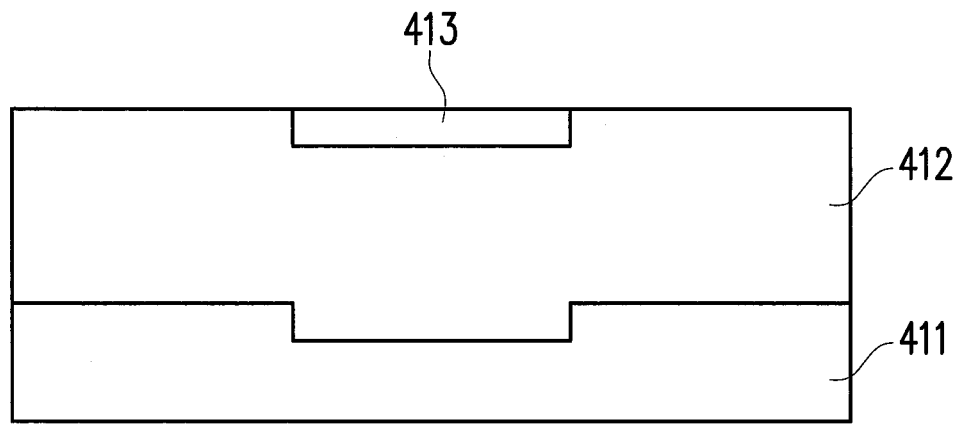
Figure 4E:
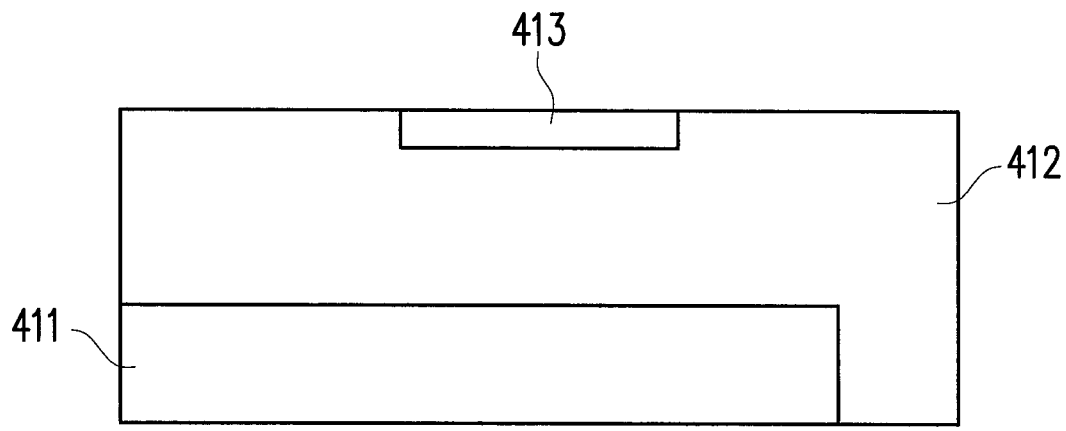
Figure 4F:
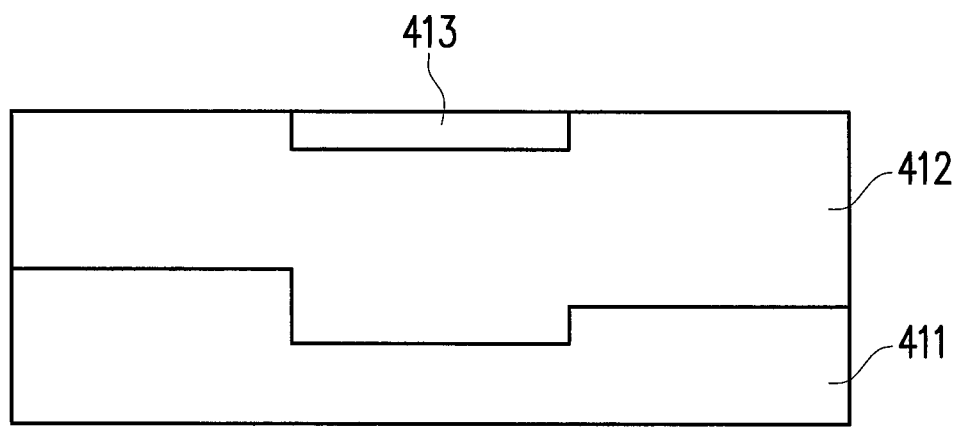
Figure 4G:
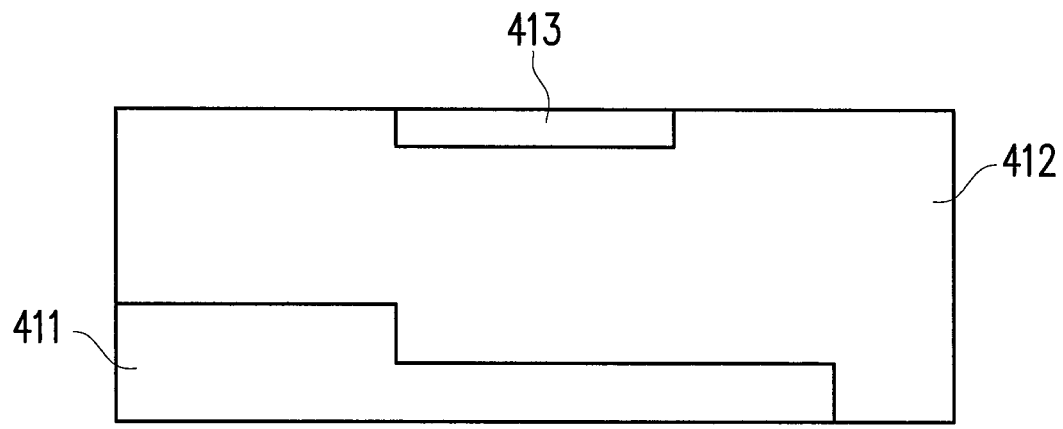
Figure 4H:
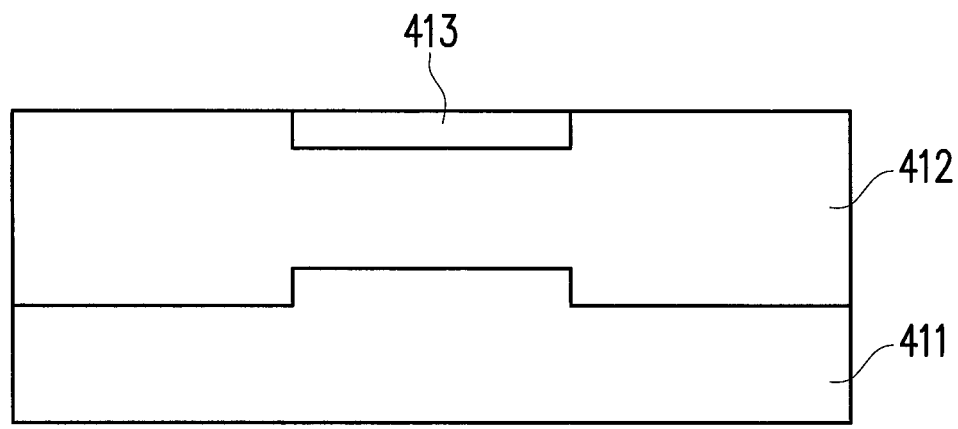

Furthermore, referring to FIG. 4B, FIG. 4B is a structural sectional diagram illustrating an implementing method of a tactile feedback apparatus 400 according to still another embodiment of the disclosure. The tactile feedback apparatus 400 includes one or more tactile feedback units 410. Deferring from FIG. 4A, the tactile feedback unit 410 depicted in FIG. 4B further includes a conductive adhesive layer 450 covering the patterned reference electrode 413. Therefore, the conductive adhesive layer 450 protects the finger from being directed contacted with the patterned reference electrode 413. The conductive adhesive layer 450 may be an anisotropic conductive film (ACF) layer.

It should be noted that the tactile feedback apparatuses illustrated in the aforementioned embodiments and implementation methods may be applied with different touch panels. For example, a resistive touch panel, a capacitive touch panel, an ultrasonic touch panel, an infrared touch panel, optical touch panel, an electromagnetic touch panel or a multi-touch panel may also be implemented with the tactile feedback apparatus of the embodiments and implementation methods of the disclosure. Additionally, the tactile feedback apparatus illustrated in the above-mentioned embodiments and implementation methods may be implemented in any part for a tactile feedback, such as a mobile phone shell, a keyboard shell or a screen shell.

Referring to FIG. 4C through FIG. 4H, FIG. 4A through FIG. 4H are structural sectional diagrams respectively illustrating different implementing methods of a tactile feedback apparatus 400 according to still another embodiment of the disclosure. Therein, the feedback electrode layer 411 may be constructed in various shapes. It should be noted that the patterned reference electrode 413 does not fully overlap the feedback electrode layer 411.

In FIG. 4A through FIG. 4H, the feedback electrode layer 411 may be embedded in the dielectric layer 412, where the feedback electrode layer 411 may be embedded in different heights therein.

Figure 5A:
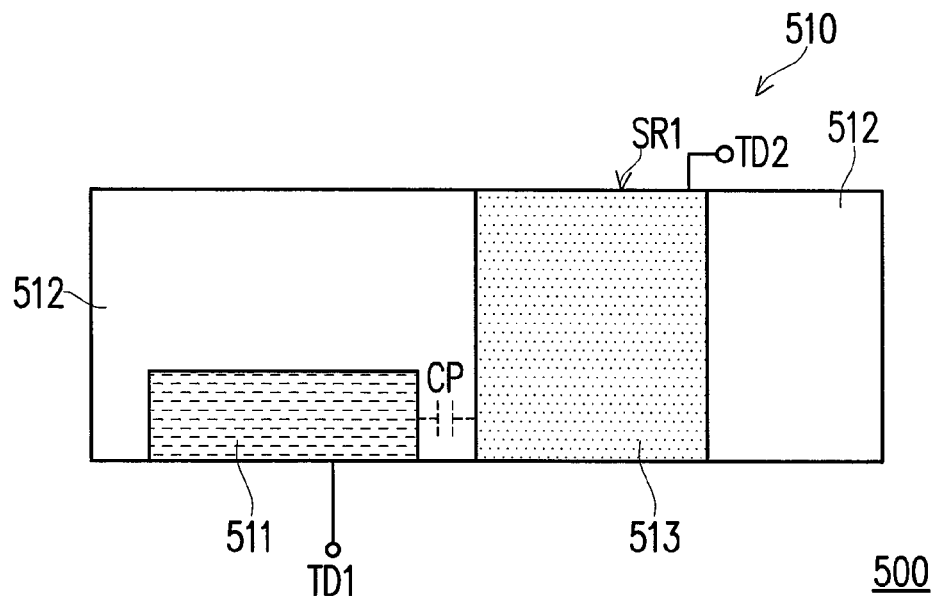
FIG. 5A through FIG. 5D are structural sectional diagrams illustrating a touch panel 500 having a tactile feedback function according to embodiments of the disclosure.
Figure 5B:
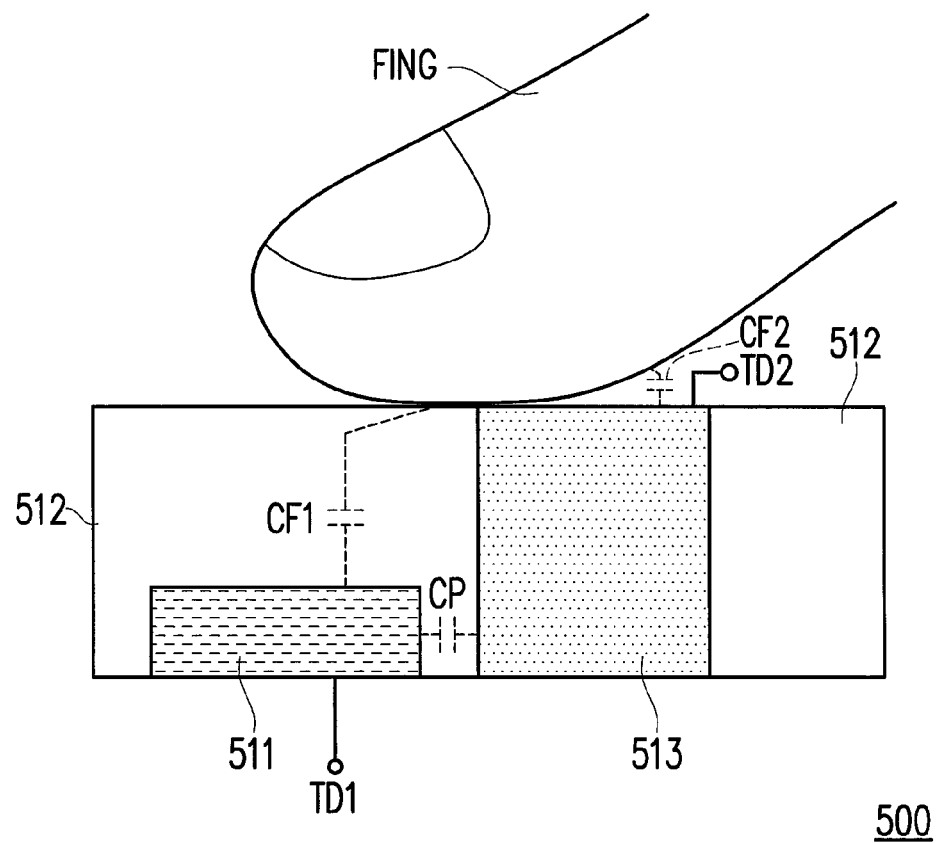

Referring to FIG. 5A and FIG. 5B, FIG. 5A and FIG. 5B are structural sectional diagrams illustrating a touch panel 500 having a tactile feedback function according to an embodiment of the disclosure. In FIG. 5A, the touch panel 500 includes one or more tactile sensing units 510 including a patterned feedback electrode 511, a dielectric layer 512 and a reference electrode 513. The dielectric layer 512 covers the patterned feedback electrode 511 has one or more openings. The reference electrode 513 is disposed in the opening. Each reference electrode 513 and each patterned feedback electrode 511 are isolated and separated from each other without overlapping with each other.

The patterned feedback electrode 511 receives a signal TD1 through a wire, and the reference electrode 513 receives a signal TD2 through a wire. When the signal TD1 is selected as a touch-sensing signal and transmitted to the patterned feedback electrode 511, the signal TD2 is selected as a touch-sensing result and transmitted out from the reference electrode 513. In the opposite, when the signal TD2 is selected as a touch-sensing signal and transmitted to the patterned feedback electrode 513, the signal TD1 is selected as a touch-sensing result and transmitted out from the reference electrode 511.

Before the tactile sensing unit 510 is touched, there is parasitic capacitance CP between the patterned feedback electrode 511 and the reference electrode 513. When the tactile sensing unit 510 is touched by the user's finger FING, referring to FIG. 5B, as shown in FIG. 5B, there is coupling capacitance CF1 generated between the user's finger FING and the patterned feedback electrode 511, and there is coupling capacitance CF2 generated between the user's finger FING and the reference electrode 513. Taking the usage of the signal TD1 as a touch-sensing signal and the signal TD2 as a touch-sensing result for example, before and after the tactile sensing unit 510 is touched by the finger FING, the capacitance value between the patterned feedback electrode 511 and the reference electrode 513 is changed, and thus, through transmitting the signal TD1 is a fixed format (e.g. a periodic impulse wave having a plurality of impulses), the change state of the capacitance value between the patterned feedback electrode 511 and reference electrode 513 may be known through the signal TD2 so as to know whether the tactile sensing unit 510 is touched.

The touch sensing operation on the touch panel 500 is performed using a so-called mutual-capacitance touch sensing structure. Besides, the touch sensing operation on FIG. 1B through FIG. 3B of the disclosure may also be performed based on the aforementioned method and the detailed operations thereof are also the same as the implantation methods illustrated in FIG. 5A and FIG. 5B, which is no longer repeated hereinafter.

Figure 5C:
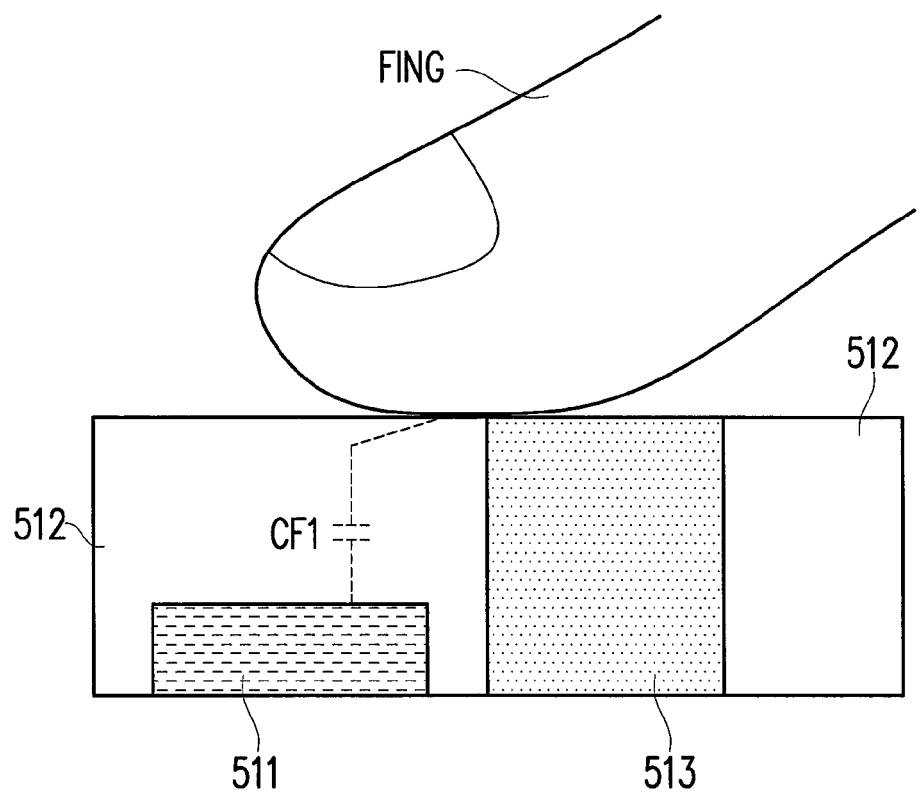

Referring to FIG. 5C hereinafter, FIG. 5C is structural sectional diagram illustrating the touch panel 500 having the tactile feedback function according to another embodiment of the disclosure. In FIG. 5C, the touch sensing operation on the touch panel 500 is performed using a so-called self-capacitance touch sensing structure. Namely, the touch sensing operation may be performed by only a single electrode. While the patterned feedback electrode 511 serves to receive the feedback driving signal, one of the reference electrodes 513 serves as a self-capacitance electrode, or alternatively, when the reference electrode 513 serves to receive the reference signal, one of the patterned feedback electrodes 511 serves as a self-capacitance electrode.

Figure 5D:
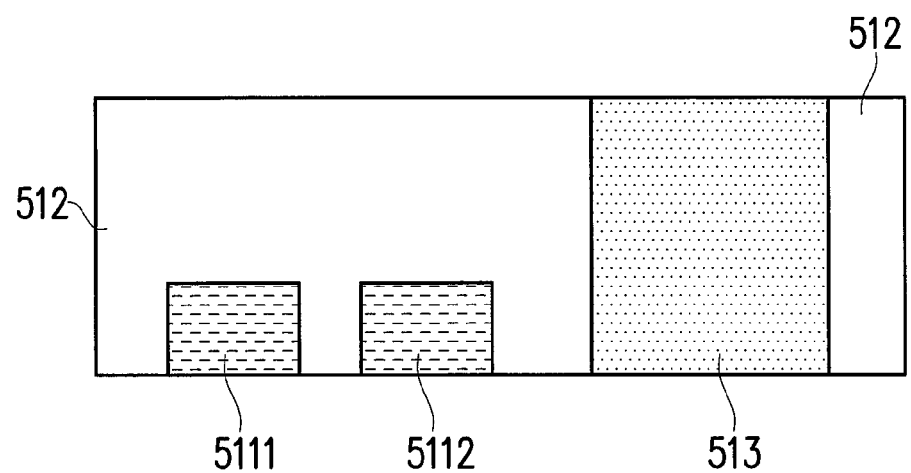

Referring to FIG. 5D hereinafter, FIG. 5D is a structural sectional diagram illustrating the touch panel 500 having the tactile feedback function according to still another embodiment of the disclosure. In FIG. 5D, the touch panel 500 includes patterned feedback electrodes 5111 and 5112, a dielectric layer 512 and a reference electrode 513. When performing the touch sensing operation, the reference electrode 513 receives the reference signal for providing tactile feedback, and the patterned feedback electrodes 5111 and 5112 serve to transmit a touch-sensing signal and receive a touch-sensing result. Otherwise, the touch panel 500 may also provide the reference electrode 513 and the patterned feedback electrode 5111 to transmit the touch-sensing signal and receive the touch-sensing result so that the patterned feedback electrode 5112 serves as an independent tactile feedback component (for receiving the feedback driving signal). Alternatively, the touch panel 500 may also provide the reference electrode 513 and the patterned feedback electrode 5112 to transmit the touch-sensing signal and receive the touch-sensing result so that the patterned feedback electrode 5111 serves as an independent tactile feedback component (for receiving the feedback driving signal).

In view of the foregoing, the disclosure mainly provides a tactile feedback apparatus structure to generate a tactile feedback through an electric filed, through which the user's finger can feel a tactile sense due to the electric field created between tactile feedback apparatus and the user's finger. Therein a common reference potential is formed by the user's finger and the tactile feedback apparatus through the reference electrode, and the capacitive effect is further generated between the user's finger and the patterned feedback electrode so that the tactile feedback is generated to the user. Meanwhile, the tactile feedback apparatus structure introduced by the disclosure may also be applied to a touch panel. Namely, the single structure introduced by the disclosure may perform the touch sensing and generate the tactile feedback so as to not only effective improve the generation performance of the tactile feedback but also efficiently lower down the cost of the touch panel.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:
1. A tactile feedback apparatus, comprising:
  at least one tactile feedback unit, comprising:
    at least one patterned feedback electrode;
    a dielectric layer, covering the patterned feedback electrode and having a first surface, wherein the first surface has at least one opening; and
    at least one reference electrode, disposed in the at least one opening of the dielectric layer and exposing at least one surface, wherein the reference electrode is isolated from the patterned feedback electrode by the dielectric layer and the reference electrode corresponding to the first surface is without either overlapping or at least partially overlapping the patterned feedback electrode.

2. The tactile feedback apparatus according to claim 1, wherein the patterned feedback electrode is embedded in the dielectric layer.

3. The tactile feedback apparatus according to claim 1, wherein the dielectric layer further has a second surface opposite to the first surface, a surface of the patterned feedback electrode is aligned with the second surface, and the exposed surface of the reference electrode is not higher than the first surface.

4. The tactile feedback apparatus according to claim 3, wherein the opening interpenetrates between the first surface and the second surface of the dielectric layer.

5. The tactile feedback apparatus according to claim 1, wherein the at least one opening is a blind hole.

6. The tactile feedback apparatus according to claim 1, wherein the patterned feedback electrodes form a plurality of patterned feedback electrode groups, the patterned feedback electrodes in each of the patterned feedback electrode groups are adjacently disposed one by one, and each of the at least one reference electrode is disposed between two adjacent patterned feedback electrode groups.

7. The tactile feedback apparatus according to claim 6, wherein electrical signals received by the adjacent patterned feedback electrodes in each of the patterned feedback electrode groups have the same polarity or opposite polarities.

8. The tactile feedback apparatus according to claim 1, wherein the at least one reference electrode receives a reference signal, the at least one patterned feedback electrode receives a feedback driving signal, the reference signal allows a finger touching the tactile feedback apparatus and the tactile feedback apparatus to equal to a common reference potential, and an electric filed is generated between the finger and the patterned feedback electrode according to the feedback driving signal.

9. The tactile feedback apparatus according to claim 8, wherein a voltage value of the reference signal is within +10~−10 volts, and a current of the reference signal is not more than 5 milliamp.

10. The tactile feedback apparatus according to claim 1, wherein either the at least one reference electrode further serves to receive a touch-sensing signal, and the at least one patterned feedback electrode serves to transmit a touch-sensing result, or the at least one patterned feedback electrode further serves to receive a touch-sensing signal, and the at least one reference electrode serves to transmit a touch-sensing result.

11. The tactile feedback apparatus according to claim 1, wherein one of the at least one patterned feedback electrode receives a touch-sensing signal, and another one of the at least one patterned feedback electrode transmits a touch-sensing result.

12. The tactile feedback apparatus according to claim 1, wherein one of the at least one reference electrode receives a touch-sensing signal, and another one of the at least one reference electrode transmits a touch-sensing result.

13. The tactile feedback apparatus according to claim 1, wherein either the reference electrode serves as a self-capacitive touch electrode when the patterned feedback electrode serves to receive a feedback driving signal, or the patterned feedback electrode serves as a self-capacitive touch electrode when the reference electrode serves to receive a reference signal.

14. The tactile feedback apparatus according to 1, further comprising:
   at least one conductive adhesive layer, covering the at least one reference electrode.

15. A tactile feedback apparatus, comprising:
   at least one tactile feedback unit, comprising:
      a feedback electrode layer;
      a dielectric layer, covering the feedback electrode layer by a first surface of the dielectric layer; and
      a patterned reference electrode, embedded in the dielectric layer and covering a portion of a second surface of the dielectric layer so as to expose the patterned reference electrode,
   wherein the feedback electrode layer receives a feedback driving signal, and the patterned reference electrode receives a reference signal.

16. The tactile feedback apparatus according to claim 15, wherein the reference signal allows a finger touching the tactile feedback apparatus and the tactile feedback apparatus to generate a common reference potential and allows the feedback driving signal to generate an electric filed between the finger and each patterned feedback electrode.

17. The tactile feedback apparatus according to claim 15, wherein a voltage value of the reference signal is within +10~−10 volts, and a current provided by the reference signal is not more than 5 milliamp.

18. The tactile feedback apparatus according to claim 15, further comprising:
   a conductive adhesive layer, covering the patterned reference electrodes.

19. The tactile feedback apparatus according to claim 18, wherein the conductive adhesive layer is an anisotropic conductive film (ACF) layer.

20. The tactile feedback apparatus according to claim 15, wherein the second surface of the patterned reference electrode does not protrude from the second surface of the dielectric layer.

21. The tactile feedback apparatus according to claim 15, wherein the patterned reference electrode overlaps a portion of the feedback electrode layer.

22. The tactile feedback apparatus according to claim 15, wherein the feedback electrode layer is embedded in the dielectric layer.

* * * * *